United States Patent
De Vries

[19]

[11] Patent Number: 6,091,184
[45] Date of Patent: Jul. 18, 2000

[54] OPTICAL ELEMENT AND DISPLAY DEVICE PROVIDED WITH SAID OPTICAL ELEMENT

[75] Inventor: Gosse C. De Vries, Eindhoven, Netherlands

[73] Assignee: U.S. Philips Corporation, New York, N.Y.

[21] Appl. No.: 09/059,277

[22] Filed: Apr. 13, 1998

[30] Foreign Application Priority Data

Apr. 18, 1997 [EP] European Pat. Off. .............. 97201145

[51] Int. Cl.[7] .............. H01J 5/16; H01J 61/40; H01K 1/26; H01K 1/30
[52] U.S. Cl. .................... 313/110; 313/111; 313/478
[58] Field of Search .................... 313/110, 111, 313/478, 479; 359/273, 274

[56] References Cited

U.S. PATENT DOCUMENTS

| | | | |
|---|---|---|---|
| 3,708,622 | 1/1973 | Brown, Jr. et al. .................... 178/7.82 |
| 5,060,075 | 10/1991 | Skinner .................... 358/250 |
| 5,076,674 | 12/1991 | Lynam .................... 359/274 |
| 5,157,540 | 10/1992 | Kidai et al. .................... 359/273 |
| 5,534,748 | 7/1996 | Oomen .................... 313/479 |
| 5,652,477 | 7/1997 | Tong et al. .................... 313/479 |
| 5,694,001 | 12/1997 | Wielstra .................... 313/478 |
| 5,874,801 | 2/1999 | Kobayashi et al. .................... 313/478 |

*Primary Examiner*—Ashok Patel
*Assistant Examiner*—Michael J. Smith
*Attorney, Agent, or Firm*—Norman N. Spain

[57] ABSTRACT

The optical element (29) comprises a substrate (28) provided with a light-transmitting layer (20) whose transmission in the visible range varies in response to a variation in light. The optical element (29) is characterized in that an anti-reflective layer (21) is provided between the substrate (28) and the light-transmitting layer (20), the refractive index of said anti-reflective layer preferably ranging from 1.5 to 2.2. The light-transmitting layer (20) may further be provided, on a side of the light-transmitting layer (20) facing away from the substrate, with a further anti-reflective layer (22) having a refractive index which preferably ranges between 1.3 and 1.6. The light-transmitting layer may comprise an electrochromic element (20) as well as a photochromic element. The optical element (29) is preferably provided on the outside of the display window (28) of a display device.

13 Claims, 6 Drawing Sheets

OPTICAL ELEMENT AND DISPLAY DEVICE PROVIDED WITH SAID OPTICAL ELEMENT

BACKGROUND OF THE INVENTION

The invention relates to an optical element comprising a substrate which is provided with a light-transmitting layer the transmission of which in the visible range varies in response to a variation in light.

The invention also relates to a display device comprising a display window which is provided with said optical element.

Optical elements for varying the transmission of light are used to influence the transmission and/or reflection of (visible) light, for example, of lamps, of rear view mirrors and of sunroofs for cars, or of windows for buildings ("smart windows"), or of lenses, or of spectacle lenses for (sun) glasses. They are also used on the viewing side of display windows of (flat-panel) display devices, such as cathode ray tubes (CRTs), plasma display panels (PDPs) and liquid-display devices (LCDs, LC-TVs and plasma-addressed LCDs) to improve the contrast of the image reproduced. By virtue thereof, the feasibility of readily bringing the light transmission to a desired value is increased and, for example, the necessity of changing the glass composition of the display window of a display device is avoided.

The light-transmitting layers mentioned in the opening paragraph influence the intensity of reflected ambient light and the intensity of light originating from an (internal) light source, such as the phosphors in a CRT. Incident ambient light passes through the layer and is reflected, for example, at the substrate or at the phosphors of color filters in a CRT, whereafter the reflected light passes through the layer again. If the transmission of the layer amounts to T, the intensity of the reflected ambient light decreases by a factor of $T^2$. Light originating from the internal light source(s), however, passes through the light-transmitting layer only once, so that the intensity of this light decreases only by a factor of T. The combination of these effects leads to an increase of the contrast by a factor of $T^{-1}$.

Examples of optical elements for varying the transmission of light include, inter alia, electrochromic elements and photochromic elements.

Oxides of specific transition metals are capable of accepting guest atoms such as hydrogen and alkali-metal atoms. If the oxide forms part of an electrochemical cell, the guest atoms can be accepted and released again in a reversible manner. In general, an electrochromic element comprises a first (transparent, conductive) electrode which is connected to an electrochromic layer, the so-called work electrode, and a second (transparent, conductive) electrode, the so-called counter electrode, which contains a material which serves as a source and as an acceptor for the guest atoms, and an ion-conducting (liquid, polymeric or solid) material, the so-called electrolyte, being present between said two electrodes. The transmission properties of the electrochromic element in the visible range undergo a change when a voltage difference is applied across the electrochromic element. As the variation in light is often detected via a light sensor provided in the vicinity of the electrochemical cell, this is referred to as an indirect response to a variation in light.

A photochromic element comprises a layer which contains a material whose transmission varies (automatically) as a result of electromagnetic radiation, such as light, which is incident on the layer (direct response to a variation in light).

A large number of photochromic materials, which can be placed in various categories (for example spiro-pyranes, spiro-oxazines or fulgides) are known from the relevant literature. Such a photochromic element enables, for example, the contrast of a (luminescent) image to be increased by providing a photochromic layer on the viewing side of the display window of a display device, the local transmission of the layer in the visible range being governed by the radiation which is (locally) incident on the layer. The transmission of the photochromic element depends (preferably) on radiation which impinges on the layer and the wavelength of which is outside the range in which the display device emits light (for example: the display device emits light in the visible range, while the photochromic element is sensitive to light from the so-called UV-A range) and said transmission decreases automatically as the intensity of the incident light increases.

An optical element of the type mentioned in the opening paragraph is disclosed in U.S. Pat. No. 5,060,075 (PHA 40,577), in which the contrast of a luminescent image is increased by providing a front panel which is arranged in front of a display window of a CRT display device with a light-transmitting layer (for example an electrochromic element), which reduces the reflection of ambient light if the brightness of said ambient light increases. A light sensor, which is provided in the vicinity of the display window, detects variations in ambient light, and a control circuit, which is electrically connected to the light sensor and the front panel, produces, while the display device is in operation, such a control signal that the degree to which the front panel passes light decreases as a function of the increase of the illumination or the intensity of the ambient light (indirect response to a variation in ambient light).

Such optical elements often have the disadvantage that the contrast of the image reproduced is not optimal.

SUMMARY OF THE INVENTION

It is an object of the invention to provide, inter alia, an optical element of the type mentioned in the opening paragraph, in which the contrast of the image reproduced is improved.

To achieve this, the optical element in accordance with the invention is characterized in that the optical element is provided, between the substrate and the light-transmitting layer, with an anti-reflective layer.

The invention is based on the insight that (specular) reflections occur at the transition between the substrate and the light-transmitting layer. If there is little ambient light, these reflections are generally not considered to be very disturbing. If there is much ambient light and the light transmission of the light-transmitting layer is minimal, specular reflections do occur at the interface between the substrate and the light-transmitting layer, however, as, in this case, the light transmission of the light-transmitting layer is minimal, these specular reflections are generally not considered to be very disturbing. In the intermediate situation, in which there is an average quantity of ambient light and the light-transmitting layer has adjusted so that a corresponding average light transmission is achieved, specular reflections occurring at the interface between the substrate and the light-transmitting layer are perceived as disturbing. As a result of these specular reflections, the contrast of the image reproduced, which is improved due to the fact that the light transmission of the light-transmitting layer is adapted to the intensity of the ambient light, is (partially) annihilated again. By "average light transmission" of the light-transmitting layer in connection with the present invention is meant that the light transmission ranges between a minimum value and a maximum value depending on the intensity of the ambient light.

The disturbing specular reflections occurring at the interface are reduced by providing, in accordance with the measure of the invention, an anti-reflective layer between the substrate and the light-transmitting layer. Particularly in the intermediate region (a combination of an average quantity of ambient light and a light-transmitting layer whose average light transmission is adapted thereto) the contrast of the image reproduced is improved by means of this measure.

A preferred embodiment of the optical element in accordance with the invention is characterized in that the anti-reflective layer comprises a material having a refractive index $n_{AR}$ in the range from $1.5 \leq n_{AR} \leq 2.2$.

If the refractive index $n_{LTL}$ of the light-transmitting layer or layers, situated in the vicinity of the interface of the substrate and the light-transmitting layer, is relatively high (for example $1.8 \leq n_{LTL} \leq 2.2$, for example an optical element with an electrochromic layer comprising a stack of materials having a high refractive index) relative to the refractive index of the substrate $n_S$ (for example $n_S \approx 1.5$ (glass)), in a first-order approximation, a so-called "matching layer" having a good anti-reflective effect is obtained by providing, between the substrate and the light-transmitting layer, an anti-reflective layer having a so-called average refractive index $n_{AR}$, in other words:

$$1,5 \leq n_{AR} = \sqrt{n_{LTL} \cdot n_S} \leq 2,2.$$

This formula holds in the range in which the light impinges at least substantially at right angles on the optical element.

In general, the anti-reflective layer may also be composed of a number of layers. Techniques of designing and employing anti-reflective layers (layer thickness, refractive index, dispersion) are generally known.

Particularly suitable materials having a refractive index $n_{AR}$ in said range include silicon nitride ($Si_3N_4$), aluminum oxide ($Al_2O_3$) and antimony tin-oxide (ATO). Also mixed layers, for example a mixed layer of silicon oxide ($SiO_2$) and titanium oxide ($TiO_2$) are materials having the desired optical properties (refractive index $1.45 \leq n \leq 2$).

If the refractive index $n_{LTL}$ of the layer or layers of the light-transmitting layer or layers, situated in the vicinity of the interface of the substrate and the light-transmitting layer, is similar (for example $1.4 \leq n_{LTL} \leq 1.6$, for example an optical element with a photochromic layer on the basis of $SiO_2$) to the refractive index of the substrate $n_S$ (for example $n_S \approx 1.5$ (glass)), and if the light-transmitting layer has an optical thickness of n.¼λ (λ is the wavelength of the light (in nm)) in a first-order approximation, a layer having a good anti-reflective effect is obtained by providing, between the substrate and the light-transmitting layer, an anti-reflective layer having a relatively high refractive index $n_{AR}$, in other words $1.8 \leq n_{AR} \leq 2.2$.

The outside surface of the optical element at the transition from the optical element to the medium surrounding the optical element (air), constitutes a further source of (specular) reflections in the optical element. The intensity of such reflections is influenced only slightly by the degree of light-transmission of the light-transmitting layer. However, the degree of light transmission of the light-transmitting layer does have a substantial influence on the visibility and hence the disturbing effect of the reflections at the abovementioned transition from the optical element to air. The improvement of the contrast which is obtained as a result of the reduction of the light transmission of the light-transmitting layer when the intensity of the ambient light increases, is (partially) diminished by the specular reflections occurring at the outside surface of the optical element. As the intensity of the ambient light increases, these reflections become more and more disturbing. To preclude this, an embodiment of the optical element in accordance with the invention is characterized in that the light-transmitting layer on a side of the light-transmitting layer facing away from the substrate is provided with a further anti-reflective layer.

By providing, in accordance with the preferred inventive measure, an anti-reflective layer on the outside surface of the optical element, the disturbing specular reflections which occur at the interface between the optical element and air are reduced. By virtue of this measure, the contrast of the image reproduced is further improved.

A preferred embodiment of the optical element in accordance with the invention is characterized in that the further anti-reflective layer comprises a material having a refractive index $n_L$ in the range from $1.3 \leq n_L \leq 1.6$.

The refractive index of air $n_0$ is approximately 1, while the refractive index $n_{LTL}$ of the layer or layers of the light-transmitting layer situated near the interface of air and the optical element ranges from approximately 1.8 to approximately 2.2 (for example an optical element with an electrochromic layer comprising a stack of materials having a high refractive index). In a first-order approximation, a so-called "matching layer" having a good anti-reflective effect is obtained by providing, between the optical element and air, an anti-reflective layer having a so-called average refractive index $n_L$, in other words:

$$1 \leq n_L = \sqrt{n_{LTL} \cdot n_0} \leq 1.6.$$

The formula holds in the range in which the light impinges at least substantially at right angles on the optical element. Suitable materials having a refractive index in said range include magnesium fluoride ($MgF_2$) and silicon oxide ($SiO_2$). Another material which can suitably be used is a so-called hybrid network comprising an inorganic network of silicon dioxide ($SiO_2$) and organic (carbon-containing) polymers which are chemically bonded to the inorganic network via Si—C bonds. In general, the anti-reflective layer may alternatively be composed of a number of layers (such anti-reflective layers are generally composed of alternate layers having a refractive index $n_H$ and $n_L$, respectively, where $n_H > 1.6$).

If the refractive index $n_{LTL}$ of the layer or layers of the light-transmitting layer or layers, situated near the interface between air and the optical element, is similar (for example $1.4 \leq n_{LTL} \leq 1.6$, for example an optical element with a photochromic layer on the basis of $SiO_2$) to the refractive index of the substrate $n_S$ (for example $n_S \approx 1.5$ (glass)), a good anti-reflective effect is obtained by providing, between the optical element and air, an anti-reflective layer having a refractive index $n_L$, where $1.0 \leq n_L \leq 1.6$.

A particular situation arises if the thickness of the optical element is less than 10.λ, where λ is the wavelength of light. This situation arises if the light-transmitting layer has a thickness below 5 μm, for example below 2 μm. In this case, a light-transmitting layer which is composed of one or more relatively thin layers having a relatively high refractive index ($1.5 \leq n_{LTL} \leq 2.6$) is situated between a substrate having a refractive index $n_S \approx 1.5$ (glass), for example the display window of a display device) and air ($n_0 \approx 1$). A combination of one or more layers having a relatively high refractive index between two layers having a relatively low refractive index causes so-called Fabry-Perot effects. If the anti-reflective layers are provided on either side of the light-transmitting layer, such Fabry-Perot effects are suppressed.

Given the materials, layer thicknesses and optical properties (of the various layers) of the light-transmitting layer, a suitable choice of the materials, layer thicknesses and optical properties for the anti-reflective layer or layers can be made by means of generally known design programs for optical coatings. If necessary, the (optical) thickness of one or more of the layers of the light-transmitting layer can be adapted so as to further improve the desired anti-reflective properties of the optical element.

These and other aspects of the invention will be apparent from and elucidated with reference to the embodiments described hereinafter.

BRIEF DESCRIPTION OF THE DRAWINGS

The Figures are purely schematic and not drawn to scale. In particular for clarity, some dimensions are exaggerated strongly. In the Figures, like reference numerals refer to like parts, whenever possible.

DETAILED DESCRIPTION OF THE DRAWINGS

Figure 1A:
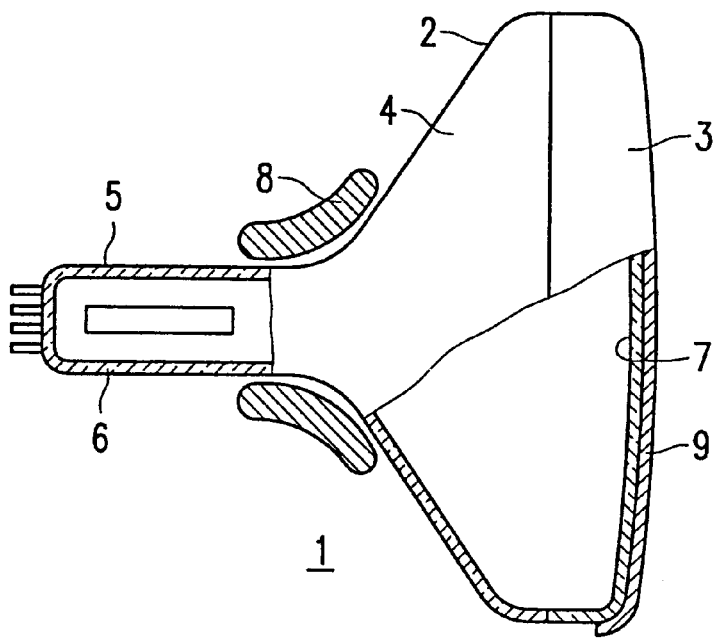
FIG. 1A is a partly cut-away view of a display device with a cathode ray tube provided with an optical element in accordance with the invention.

The invention will now be described in greater detail with reference to the figures of the drawing.

FIG. 1A is a schematic, cut-away view of a display device comprising a cathode ray tube (CRT) 1 having a glass envelope 2 including a display window 3, a cone 4 and a neck 5. An electron gun 6 for generating one or more electron beams is situated in said neck. This (these) electron beam(s) is (are) focused on a phosphor layer 7 on the inner surface of the display window 3 and is (are) deflected across said display window 3 in two mutually perpendicular directions by means of a deflection coil system 8. The outer surface of the display window 3 of the display device 1 is provided with an optical element 9 in accordance with the invention. Preferably, the optical element is provided directly on the outer surface of the display window of the display device (see FIG. 1A). In an alternative embodiment, the optical element is provided on a (flat) so-called front panel which is arranged in front of the display window on the viewing side of the display device.

Figure 1B:
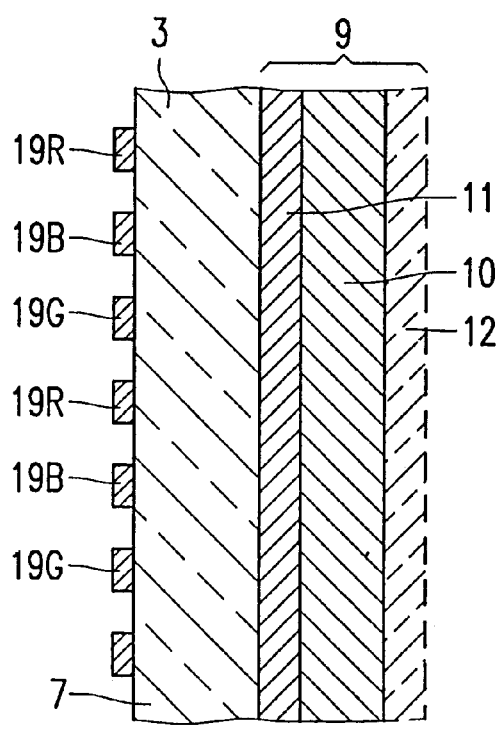
FIG. 1B is a cross-sectional view of a detail of FIG. 1A.

FIG. 1B is a cross-sectional view of a detail of FIG. 1A, in which the phosphor layer 7 on the inner surface of the display window 3 comprises a regular pattern of electroluminescent spots 19R, 19G, 19B. Said spots 19R, 19G, 19B each contain a suitable phosphor of the right color: red 19R, green 19G or blue 19B. Preferably, the outer surface of the display window 3 is provided with an optical element 9 having a variable transmission. Element 9 at least comprises a light-transmitting layer 10 of a material whose transmission properties in the visible range vary directly or indirectly as a result of variations in ambient light. The invention is important, in particular, for optical elements which serve to vary the transmission of light, and which comprise an electrochromic element (indirect response to a variation in light) or a photochromic element (direct response to a variation in light). The layer 10 may be composed of one or more layers.

In FIG. 1B, an anti-reflective layer 11 in accordance with the invention is provided at the location of the transition between the display window 3 (substrate) and the light-transmitting layer 10. The provision of this anti-reflective layer 11 causes (specular) reflections occurring at the interface between the display window 3 and the light-transmitting layer 10 to be reduced. Particularly in a situation in which an average quantity of ambient light is incident on the optical element 9 and the light-transmitting layer 10 has adjusted thereto so that a corresponding average light transmission is achieved, such specular reflections occurring at the interface between the substrate (display window 3) and the light-transmitting layer 10 are considered to be disturbing. As a result of these disturbing specular reflections, the contrast of the image reproduced, which is improved by adapting the light transmission of the light-transmitting layer 10 to the intensity of the ambient light, is partly decreased again. By providing the anti-reflective layer 11, these specular reflections between the display window 3 and the light-transmitting layer 10 are effectively suppressed.

In FIG. 1B, a second anti-reflective layer 12 is provided which further reduces the (specular) reflections of the optical element 9 on the viewing side or the outside of the optical element 9. In FIG. 1B, layer 12 is represented by dotted lines because this layer may alternatively be omitted.

Figure 1C:
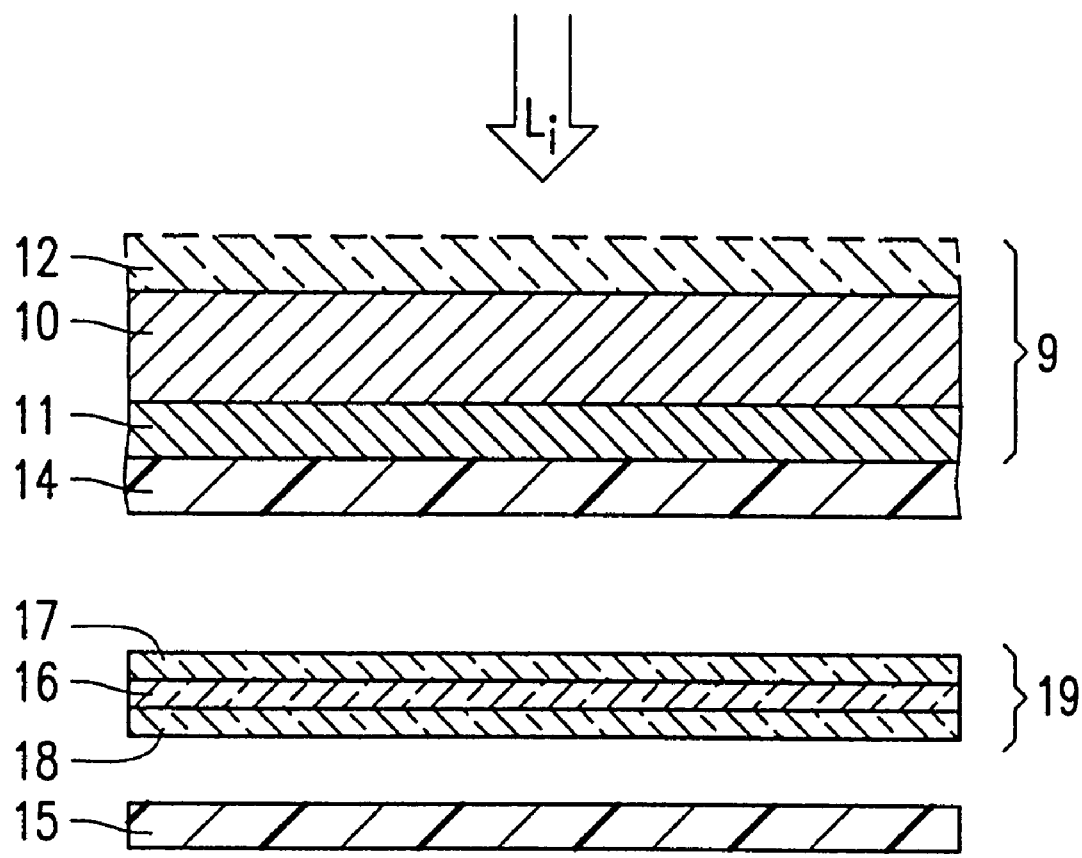
FIG. 1C is a cross-sectional view of a liquid-crystal display device provided with an optical element in accordance with the invention.

FIG. 1C is a schematic, cross-sectional view of a liquid-crystal color display device (LCD) having a number of liquid-crystal cells 19 for displaying colors comprising a liquid-crystalline layer 16 which is sandwiched between two electrode substrates 17, 18. The electrodes on the substrates 17, 18 are not shown in the Figure. Besides, for convenience, only one liquid-crystal cell 19 is shown. In this case, the device comprises two polarizers 14, 15. Ambient light can enter the LCD both at the outer surface of polarizer 14 and at the outer surface of polarizer 15. In FIG. 1C, the ambient light $L_i$ is incident on the outer surface of polarizer 14; in this case, an optical element 9, as described hereinabove, is provided on the outer surface of polarizer 14.

In FIG. 1C, an anti-reflective layer 11 in accordance with the invention is provided at the location of the transition between the polarizer 14 (substrate) and the light-transmitting layer 10. The provision of this anti-reflective layer 11 causes (specular) reflections occurring at the interface between the polarizer 14 and the light-transmitting layer 10 to be effectively suppressed. In FIG. 1C, a second anti-reflective layer 12 is provided which further reduces the (specular) reflections of the optical element 9 on the viewing side or the outside of the optical element 9; said layer 12 is represented by dotted lines because it may alternatively be omitted.

In order to be able to react rapidly to variations in the intensity of ambient light, a change in the transmission of the light-transmitting layer 10 of the optical element 9 as a result of a variation in the intensity of the ambient light $L_i$ takes place in less than 5 minutes, preferably less than 1 minute. Preferably, the light-transmitting layer 10 (in the state in which the transmission of the light-transmitting layer is high) is insensitive to luminous flux densities below 100 lux, preferably below 10 lux.

Figure 2A:
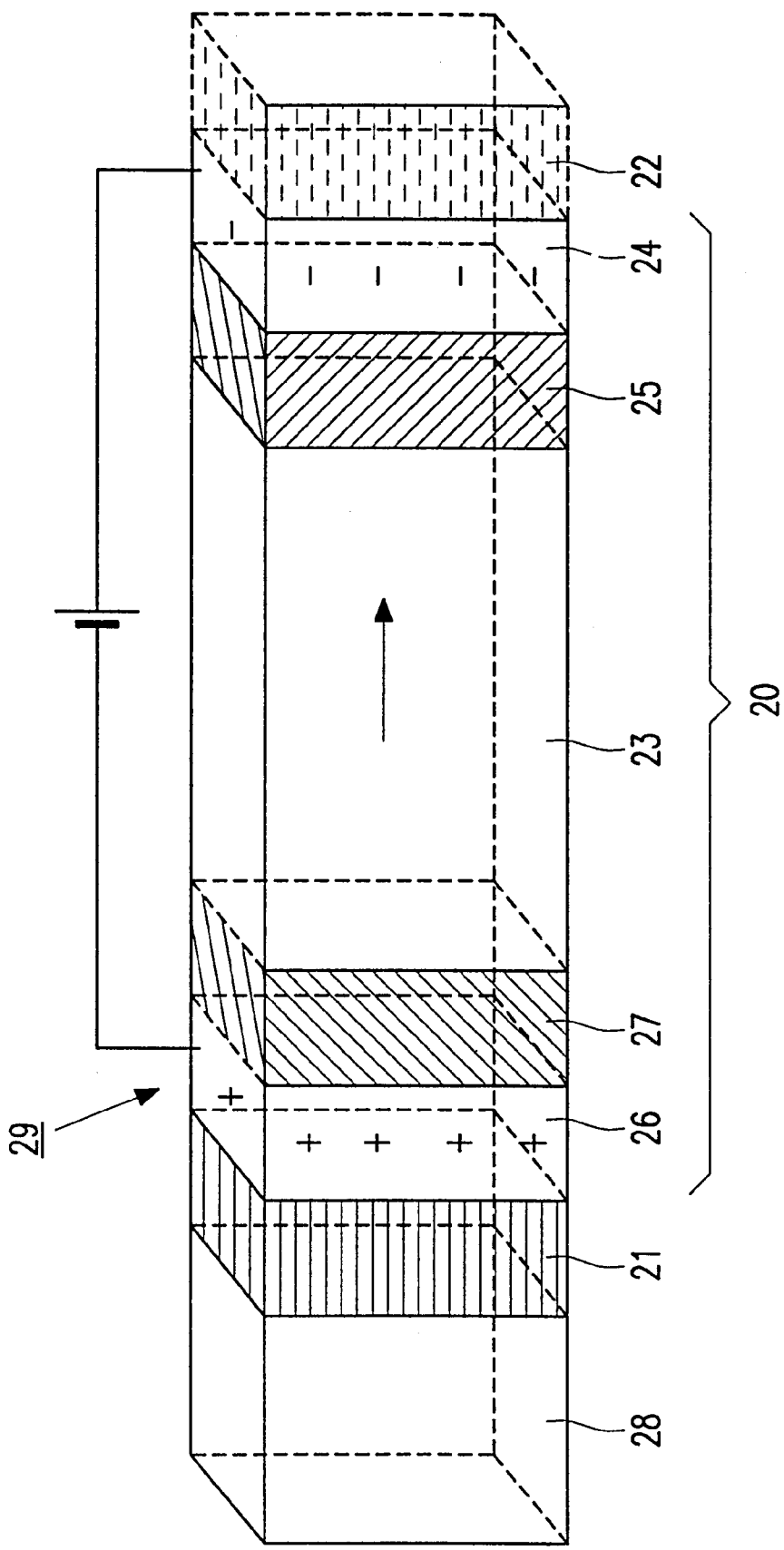
FIG. 2A is a partly perspective view of an example of an optical element comprising a combination of a light-transmitting layer including an electrochromic element and an anti-reflective layer in accordance with the invention.

FIG. 2A is a highly schematic, partly perspective view of an example of an optical element 29 comprising a combination of a light-transmitting layer having an electrochromic element 20 and an anti-reflective layer 21, 22 in accordance with the invention. This electrochromic element includes two half cells, which are interconnected ("laminated") via a (polymeric) electrolyte 23. The first half cell comprises a transparent conductor 24, for example ITO (indium tin oxide) and an electrochromic layer 25, for example, of $WO_3$ or a mixture of $WO_3$ and $V_2O_5$ or mixtures of other suitable electrochromic materials, which layer is also referred to as work electrode. The second half cell comprises, on a transparent substrate 28, for example of glass, a transparent conductor 26, for example of ITO, and a so-called ion-storage layer 27, also referred to as counter electrode. A voltage difference is applied between the transparent conductors 24 and 26. Preferably, the optical element 29 comprises a second anti-reflective layer (layer 22, indicated by dotted lines in FIG. 2A). The counter electrode 27 is generally responsible only for storing and releasing guest ions, such as hydrogen ions ($H^+$) and alkali metal ions, such as $Li^+$ ions, and usually does not contribute, or only contributes to a small extent, to the change in color of the electrochromic element (for example if the counter electrode 27 contains cerium oxide ($CeO_2$); other suitable materials are $IrO_2$ and mixtures of $CeO_2$ and $TiO_2$). The ion conductor is responsible for a rapid transfer of the guest ions and, preferably, has a high resistance to electroconduction by electrons (in FIG. 2A, the movement of the ions is indicated by means of an arrow). The metal oxides in the electrochromic layer 25 serve to ensure that the transmission properties, upon applying a voltage difference across the element, undergo a reversible change from (colorless) transparent to dark-colored (generally not color neutral).

If the two half cells are laminated via a polymeric electrolyte 23, for example a mixture of polyethylene oxide (PED), polymethyl methacrylate (PMMA) and a specific quantity of $LiClO_4$, the thickness of the polymeric electrolyte 23 is approximately 1–1,000 $\mu$m. In a so-called solid-state electrochromic element, the electrolyte 23 is formed by a (coating) layer of a transition metal, for example $Ta_2O_5(H^+$ conduction) or $LiNbO_3$ ($Li^+$ conduction). In the case of an "all solid-state" electrochromic element, said element can be provided in the form of a system of (coating) layers on the substrate 28 by means of known techniques, and the thickness of the electrolyte is, for example, 0.2 $\mu$m. Said known application techniques include spinning, sol-gel processing, CVD (chemical vapor deposition), vapor deposition (PVD physical vapor deposition) and (reactive) sputtering, and combinations thereof.

Figure 2B:
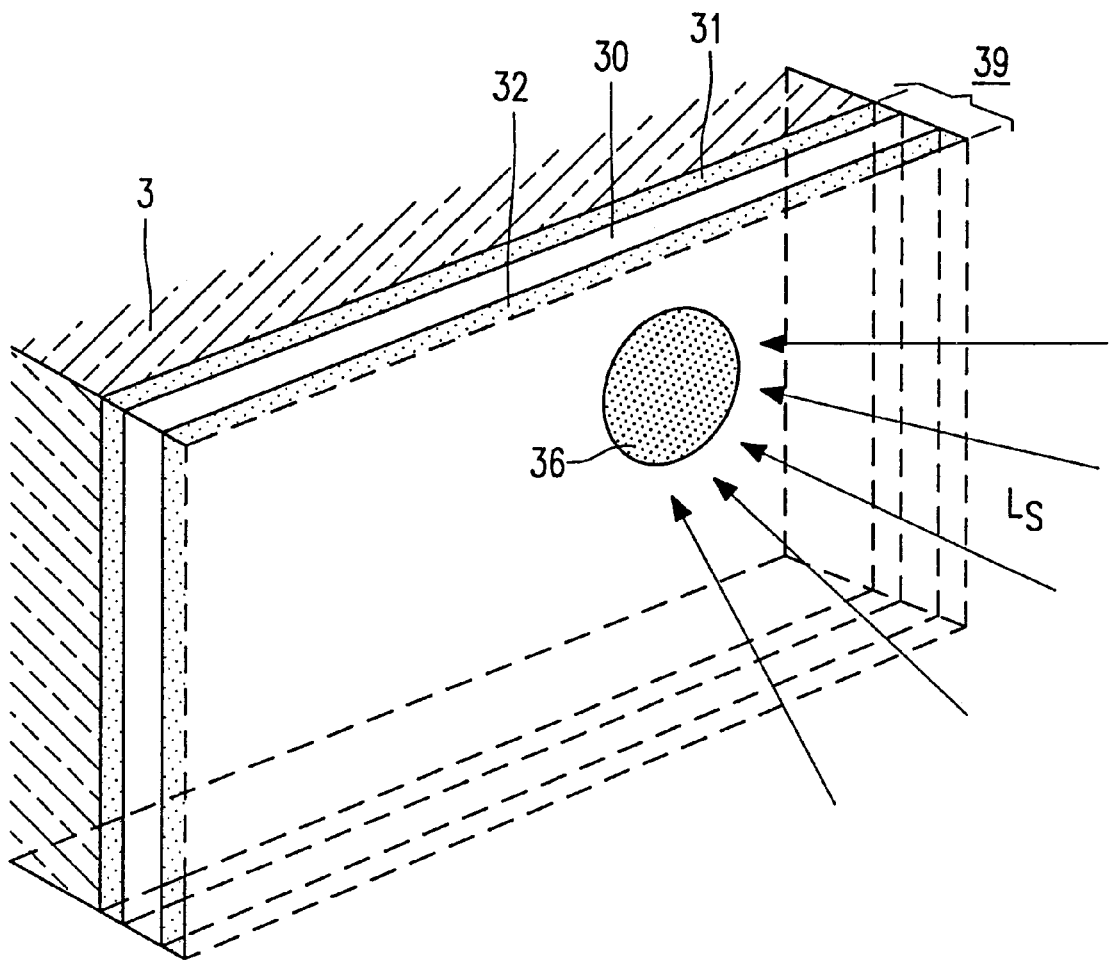
FIG. 2B is a partly perspective view of an example of an optical element comprising a combination of a light-transmitting layer including a photochromic element and an anti-reflective layer in accordance with the invention.

FIG. 2B is a highly schematic, partly perspective view of an example of an optical element 39 comprising a combination of a light-transmitting layer including a photochromic element 30 and an anti-reflective layers 31, 32 in accordance with the invention, which is provided on a display device, the outer surface of a display window 3 being provided with an optical element 39 comprising said photochromic layer 30. A light spot 36 originating from the environs of the display device impinges on a part of the display window. Radiation $L_s$, which causes said light spot 30, can originate, for example, from sunlight which enters directly or indirectly, whether or not through (double) window glass, and impinges on a part of the display window. The light spot 36 may alternatively originate from another source of radiation in the environs of the display device, for example a lamp. In FIG. 2B, a circular light spot 36 is shown. The light spot 36 may have any shape and illuminate a part of the display window or the entire display window of the display device. Said light spot 36 may alternatively consist of various light spots. In particular, the intensity of light spot 36 on the display window may differ from place to place. At the location of light spot 36, the contrast of the image reproduced on the display window 3 of the display device may be reduced substantially as a result of the intensity of the light spot 36. A characteristic of the photochromic layer 30 is that the transmission of the layer 30 varies automatically at the location of the light spot 36, so that always an optimum contrast at the location of light spot 36 is obtained. Preferably, the optical element 39 includes a second anti-reflective layer (layer 32, shown by means of dotted lines in FIG. 2B).

EXAMPLE 1

An example of an optical element 29 comprising a light-transmitting layer including an electrochromic element 20 and one or two anti-reflective layers 21, 22 is formed by the following system of layers (see Table I and FIG. 2A):

1. a so-called all-solid state electrochromic element 20 comprising 5 layers, namely:
   a first transparent conductor 24 of ITO (indium tin oxide) (thickness ≈ 0.3 $\mu$m, refractive index ≈ 2.0),
   a work electrode 25 of tungsten oxide ($WO_3$) (thickness ≈ 0.4 $\mu$m, refractive index ≈ 2.0),
   a solid-state electrolyte 23 of tantalum oxide ($Ta_2O_5$) (thickness ≈ 0.2 $\mu$m, refractive index ≈ 2.0),
   a counter electrode 27 of nickel oxide (NiO) (thickness ≈ 0.3 $\mu$m, refractive index ≈ 2.0),
   a second transparent conductor 26 of ITO (indium tin oxide) (thickness ≈ 0.3 $\mu$m, refractive index ≈ 2.0),
2. between the electrochromic element 20 and the substrate 28: an anti-reflective layer 21 of aluminium oxide ($Al_2O_3$) (optical thickness ≈ ¼$\lambda$, geometric thickness ≈ 0.1 $\mu$m, refractive index ≈ 1.62);
3. and, preferably, on the outside of the electrochromic element 20: a further anti-reflective layer 22 of silicon oxide ($SiO_2$) (optical thickness ≈ ¼$\lambda$, geometric thickness ≈ 0.1 $\mu$m, refractive index ≈ 1.46).

TABLE 1

Electrochromic element with anti-reflective layers

| substrate | $Al_2O_3$ | ITO | NiO | $Ta_2O_5$ | $WO_3$ | ITO | $SiO_2$ | air |
|---|---|---|---|---|---|---|---|---|
| n ~ 1.5 | n ~ 17 | n ~ 2 | n ~ 2 | n ~ 2 | n ~ 2 | n ~ 2 | n ~ 1.5 | n ~ 1 |
| | $\lambda$/4 | ~0.3 $\mu$m | ~0.3 $\mu$m | ~0.2 $\mu$m | ~0.4 $\mu$m | ~0.3 $\mu$m | $\lambda$/4 | |

The optical element is preferably provided on the viewing side of a (display) window (substrate) of a display device. The optical element described in this example is preferably provided by means of sputtering, and the above-mentioned (coating) layers being successively deposited on the substrate in one coating operation. In a sputtering process, a mixture of ions (argon, oxygen, hydrogen; the characteristic overall pressure being approximately 1 Pa) is used to bombard a so-called target (for example metallic tungsten, tantalum, nickel, etc.), from which small particles (atomic scale) are released whose energy content is sufficient to reach the substrate (for example the window of a display device). In general, the substrate does not have to be heated to obtain layers having the desired mechanical properties. Oxidation of the layers is brought about by admitting the proper quantity of oxygen to the evacuated deposition chamber during sputtering (reactive sputtering). The target may alternatively consist of metal oxides.

The construction of an electrochromic element is similar to that of a battery, that is, they both comprise two electrodes and an electrolyte sandwiched therebetween (3 active layers), the transmission of the electrochromic element being controlled by applying a voltage difference across the element (±1.5 V). The transmission can be controlled via a light sensor (automatically via a control circuit) or via a remote control operated by the viewer. An electrochromic element can react to light originating from a natural light source as well as to light originating from an artificial light source. If the display device is in the off position (stand-by), the electrochromic element can be set at a specific transmission (for example a minimum transmission to improve the appearance of the display device).

The overall thickness of the electrochromic element 20 described in this example is approximately 1.5 $\mu$m. The overall transmission Tt of the electrochromic element 20 varies in the range from 0.1 to 0.9 ($10 \leq T_t < 90\%$). The diffuse reflection coefficient $R_d$ of the optical element 29 is less than 1% ($R_d \leq 0.01$). Without the anti-reflective layer, the reflectivity of the electrochromic element is approximately 10–20%, which results in a poor quality of the image (low contrast). To make the best use of the extremely great dynamic range of the electrochromic element when it is used in (picture) display devices, it is desirable that the transparency of the substrate (display window) should be as high as possible. To achieve this, the transmission of the (display) window of the (picture) display device comprising the electrochromic element is preferably higher than 90%.

To obtain an optimum construction of a stack of layers comprising a combination of an electrochromic element and anti-reflective layers, it is desirable to determine the (optical) layer thicknesses of the anti-reflective layers both theoretically (computer design) and experimentally, and to optimize the (optical) layer thicknesses of the layers of the electrochromic element (for example the layer thickness of the ITO layers) without adversely affecting the electrochromic effect of the electrochromic element.

Figure 3:
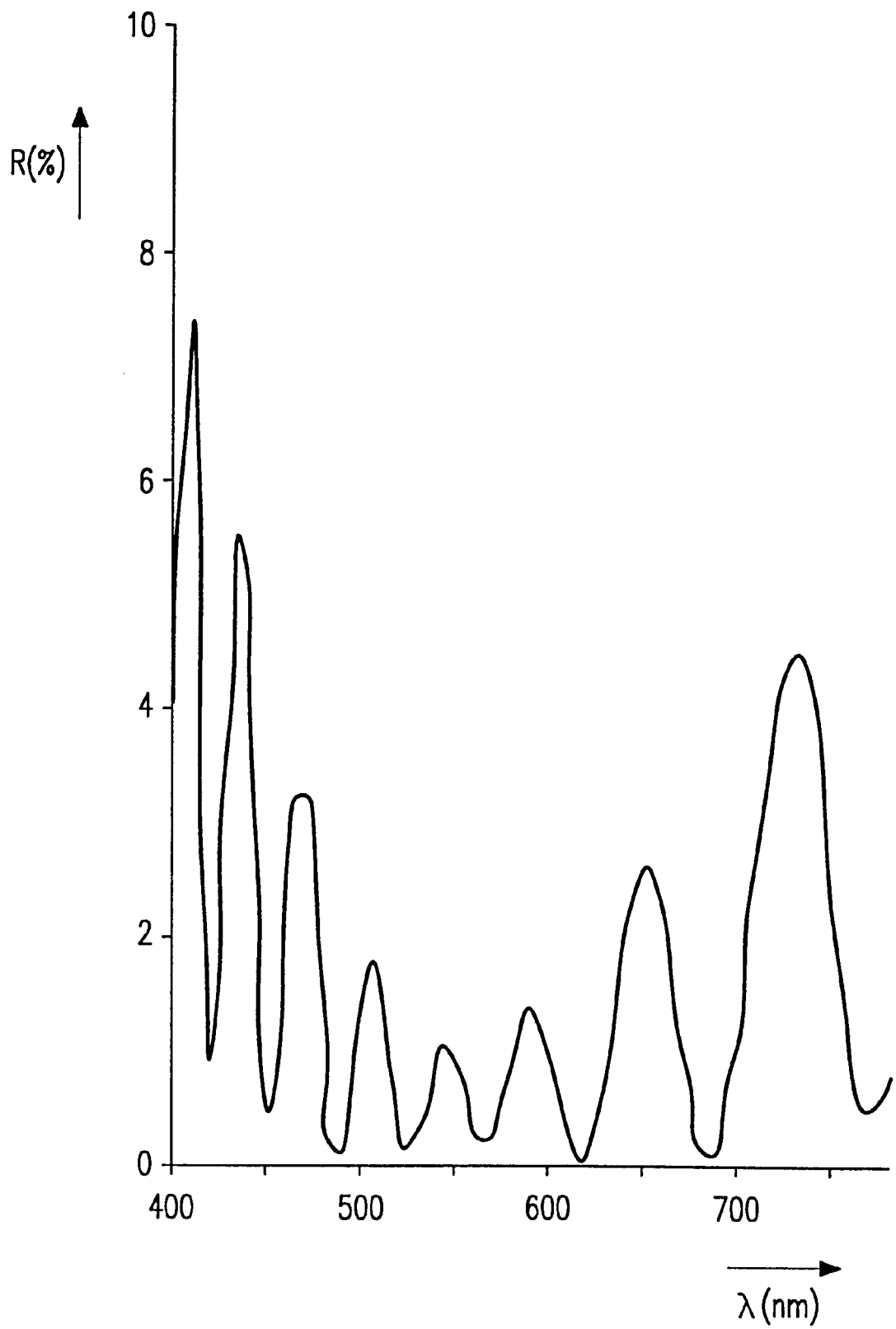
FIG. 3 shows the reflection R as a function of the wavelength $\lambda$ of the light of an optical element comprising an electrochromic element and anti-reflective layers in accordance with the invention.

FIG. 3 shows the reflection R(%) as a function of the wavelength $\lambda$ (in nm) of the light of an optical element comprising an electrochromic element and anti-reflective layers in accordance with the invention. As a result of the relatively large thickness of the electrochromic element (1.5 $\mu$m) the reflection spectrum exhibits many peaks and dips.

A measure of the effect of anti-reflective layers is the so-called luminosity. The luminosity is the brightness of a luminous surface as perceived by the eye of an observer, in this case the average reflection at the surface (the optical element) weighed according to the eye-sensitivity curve. In this application, the luminosity is expressed as a percentage, a low percentage corresponding to a low brightness of the optical element. An electrochromic element having a composition as described in the current example (five-layer system comprising layers having a refractive index of approximately 2, see Table I), which electrochromic element is provided on the viewing side of a glass display window of a display device has a luminosity of 12.6% in the absence of anti-reflective layers. Such an optical element with one anti-reflective layer (a so-called ¼$\lambda$ intermediate layer of $Al_2O_3$) which is provided between the optical element and the display window, has a luminosity of 11.5%. The optical element with one anti-reflective layer (a so-called ¼$\lambda$ top layer of $SiO_2$), which is provided on the outside (air) has a luminosity of 2.6%. If an anti-reflective layer is provided on either side of the optical element (a ¼$\lambda$ intermediate layer of $Al_2O_3$ and a ¼$\lambda$ top layer of $SiO_2$), the luminosity is further reduced by a factor of 3, i.e. 0.8%.

EXAMPLE 2

An example of an optical element 39 having a light-transmitting layer comprising a photochromic element 30 and one or two anti-reflective layers 31, 32 is formed by the following system of layers (see Table II and FIG. 2B):

1. a photochromic element 30 comprising a layer of a photochromic material in a so-called hybrid network including a combination of an inorganic network comprising $SiO_2$ and an organic polymer which is chemically bonded to the inorganic network via Si—C bonds; (thickness ≈ 0.1 $\mu$m, refractive index ≈ 1.5);
2. an anti-reflective layer 31 of ATO (antimony tin oxide) situated between the photochromic element 30 and the substrate (display window 3); (optical thickness ≈ ¼$\lambda$, geometric thickness ≈ 0.1 $\mu$m, refractive index ≈ 1.8).

TABLE II

Photochromic element having an anti-reflective layer

| substrate | ATO | photochromic element | air |
|---|---|---|---|
| n ~ 1,5 | n ~ 1,8<br>d ~ 0.1 $\mu$m | n ~ 1,5<br>d ~ 0,1 $\mu$m | n ~ 1 |

If necessary, a further anti-reflective layer 32 may be provided on the outside of the electrochromic element 30, which anti-reflective layer is composed, for example, of a layer having a high-refractive index ($TiO_2$) and a layer having a low-refractive index ($SiO_2$).

The optical element is preferably provided on the viewing side of a display window of a display device. The optical element described in this example is preferably provided by means of spin coating, in which process the layers are successively deposited on the display window in one coating operation. The overall thickness of the photochromic element 30 is approximately 0.1–10 $\mu$m. The overall transmission $T_t$ of the photochromic element 30 ranges from 0.2 to 0.95 ($20 \leq T_t \leq 95\%$). The diffuse reflection coefficient $R_d$ of the optical element 39 is below 1% ($R_d \leq 0.01$).

Figure 4:
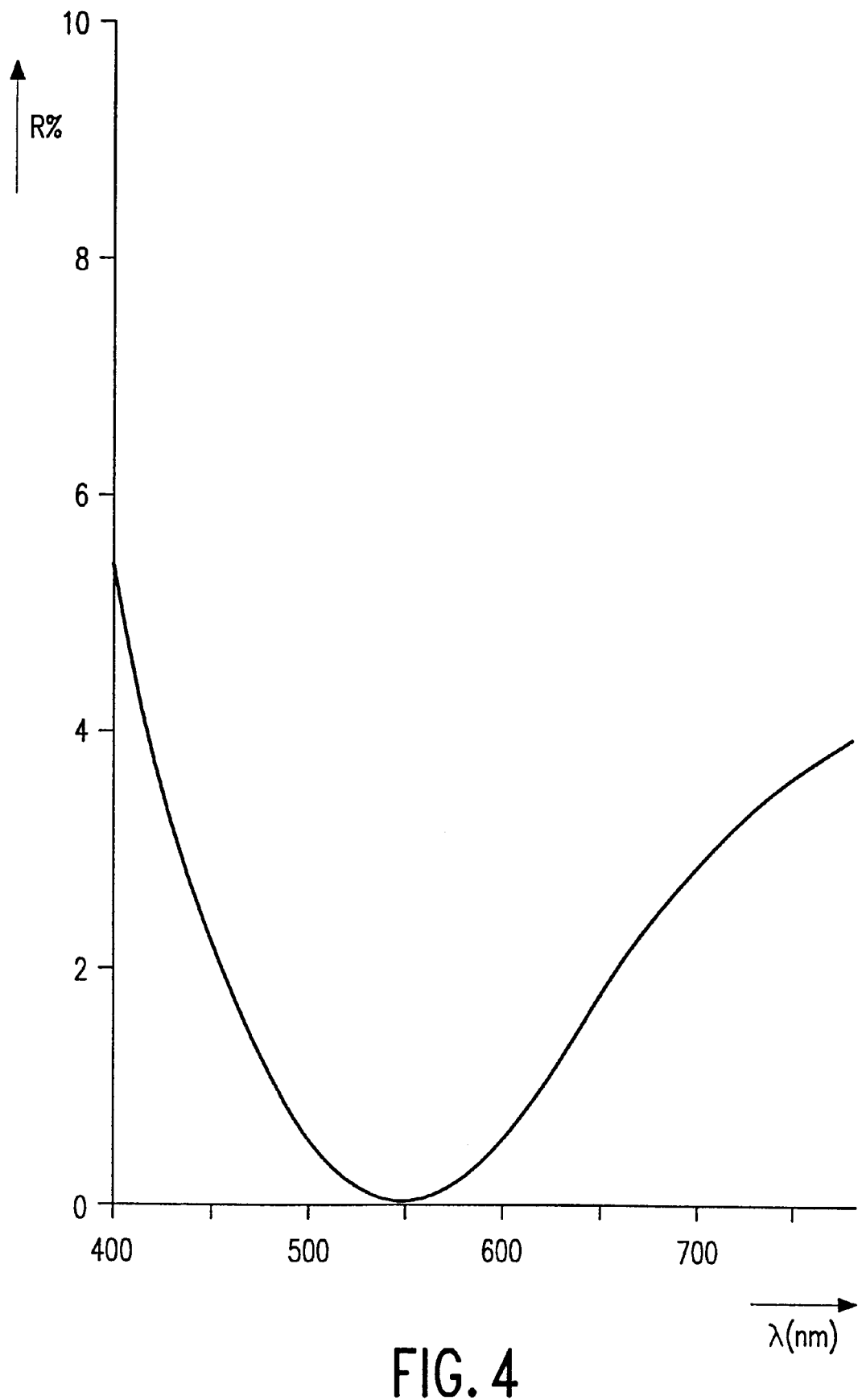
FIG. 4 shows the reflection R as a function of the wavelength $\lambda$ of the light of an optical element comprising a photochromic element and an anti-reflective layer in accordance with the invention.

FIG. 4 shows the reflection R(%) as a function of the wavelength $\lambda$ (in nm) of the light of the optical element comprising a photochromic element and an anti-reflective layer in accordance with the invention. The luminosity (average reflection of the optical element weighed according to the eye-sensitivity curve) of a photochromic element having a composition as described in the current example (monolayer system having a refractive index of approximately 1.5, see Table II) and being provided on the viewing side of a glass display window of a display device is 4.3% in the absence of an anti-reflective layer. Such an optical element having one anti-reflective layer (a so-called ¼$\lambda$ intermediate layer having a refractive index n≈1,8) provided between the photochromic element and the display window has a luminosity of 0.42%.

It will be obvious that within the scope of the invention many variations are possible to those skilled in the art. For example, the optical element can also be combined with anti-scratch and/or anti-static layers.

What is claimed is:

1. An optical element (9) comprising a substrate (3) which substrate is provided with a light-transmitting layer (10), the visible light transmission of said light-transmitting layer (10) varying in response to a variation in light, characterized in that an antireflective layer (11) is provided between the substrate (30 and the light-transmitting layer (10).

2. An optical element as claimed in claim 1, characterized in that the anti-reflective layer (11) comprises a material having a refractive index $n_{AR}$ in the range from $1.5 \leq n_{AR} \leq 2.2$.

3. An optical element as claimed in claim 2, characterized in that the material is selected from the group formed by silicon nitride, aluminum oxide and antimony tin oxide.

4. An optical element as claimed in claim 1, characterized in that the light-transmitting layer (10) on a side of the light-transmitting layer (10) facing away from the substrate (3) is provided with a further anti-reflective layer (12).

5. An optical element as claimed in claim 4, characterized in that the further anti-reflective layer (12) comprises a material having a refractive index $n_L$ in the range from $1.3 \leq n_L \leq 1.6$.

6. An optical element as claimed in claim 5, characterized in that the material is selected from the group formed by magnesium fluoride and silicon oxide.

7. An optical element as claimed in claim 1, characterized in that the light-transmitting layer comprises an electrochromic element (20), the transmission of said electrochromic element (20) varying as a result of the application of a voltage difference across said electrochromic element (20).

8. An optical element as claimed in claim 7, characterized in that the electrochromic element (20) comprises a tungsten-oxide layer, a tantalum-oxide layer and a nickel-oxide layer.

9. An optical element as claimed in claim 1, characterized in that the light-transmitting layer comprises a photochromic element (39), which photochromic element (39) includes a layer (30) which comprises a material whose transmission varies as a result of light which is incident on the layer (30).

10. An optical element as claimed in claim 2, characterized in that the light-transmitting layer on a side of the light-transmitting layer facing away from the substrate is provided with a further anti-reflective layer.

11. An optical element as claimed in claim 2, characterized in that the light-transmitting layer comprises an electrochromic element, the transmission of said electrochromic element varying as a result of the application of a voltage difference across said electrochromic element.

12. A display device (1) comprising an optical element as claimed in claim 1, the substrate (3) of said optical element (9) being a display window of said display device (1).

13. A display device (1) comprising an optical element as claimed in claim 2, the substrate (3) of said optical element (9) being a display window of said display device (1).

* * * * *